United States Patent
Massam et al.

(10) Patent No.: US 7,651,983 B2
(45) Date of Patent: *Jan. 26, 2010

(54) REDUCED ABRASIVENESS WITH MICRONIZED WEIGHTING MATERIAL

(75) Inventors: Jarrod Massam, Aberdeen (GB); Andrew Bradbury, Kincardinshire (GB)

(73) Assignee: M-I L.L.C., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,089

(22) Filed: Aug. 13, 2008

(65) Prior Publication Data

US 2009/0005271 A1 Jan. 1, 2009

Related U.S. Application Data

(60) Continuation-in-part of application No. 11/617,576, filed on Dec. 28, 2006, now Pat. No. 7,409,994, which is a continuation of application No. 11/145,054, filed on Jun. 3, 2005, now Pat. No. 7,176,165, application No. 12/191,089, which is a continuation-in-part of
(Continued)

(60) Provisional application No. 60/825,156, filed on Sep. 11, 2006, provisional application No. 60/576,420, filed on Jun. 3, 2004.

(30) Foreign Application Priority Data

Jul. 26, 1996 (GB) .................................. 9615549.4

(51) Int. Cl.
*C09K 8/74* (2006.01)

(52) U.S. Cl. .................................. 507/269; 166/305.1

(58) Field of Classification Search ................. 507/269; 166/305.1
See application file for complete search history.

(56) References Cited

U.S. PATENT DOCUMENTS 3,057,797 A 10/1962 Anderson et al.

(Continued)

FOREIGN PATENT DOCUMENTS

| GB | 605173 | 7/1948 |
|---|---|---|
| WO | 2005118742 | 12/2005 |
| WO | 2006/056774 A2 | 6/2006 |

OTHER PUBLICATIONS

C. W. Blount, "Synthesis of barite, celestinte, anglesite, witherite and strontianite from aqueous solutions" American Mineralogist, vol. 59, 1974, pp. 1209-1219.

(Continued)

*Primary Examiner*—Randy Gulakowski
*Assistant Examiner*—Alicia M Toscano
(74) *Attorney, Agent, or Firm*—Osha • Liang LLP

(57) ABSTRACT

A method of prolonging the average lifespan of downhole tools that includes circulating the wellbore fluid comprising a base fluid and at least one of a micronized weighting agent and a dispersant coated weighting agent through the wellbore; wherein the wellbore fluid is characterized as having at least one of an equivalent weight, an equivalent or lower settling rate, and an equivalent or lower sag than a baseline wellbore fluid comprising a base fluid and an API-grade barite weighting agent; and wherein the wellbore fluid reduces abrasive wear of the downhole tool as compared to drilling with the baseline wellbore fluid is disclosed.

14 Claims, 1 Drawing Sheet

Comparison of the coated micronized barite and API-grade barite

Related U.S. Application Data

(60) application No. 11/617,031, filed on Dec. 28, 2006, which is a continuation of application No. 11/145,053, filed on Jun. 3, 2005, now Pat. No. 7,169,738, application No. 12/191,089, which is a continuation-in-part of application No. 11/737,284, filed on Apr. 19, 2007, now abandoned, which is a continuation of application No. 10/610,499, filed on Jun. 30, 2003, now Pat. No. 7,267,291, which is a continuation-in-part of application No. 09/230,302, filed as application No. PCT/EP97/03802 on Jul. 16, 1997, now Pat. No. 6,589,372, application No. 12/191,089, which is a continuation-in-part of application No. 11/737,303, filed on Apr. 19, 2007, now Pat. No. 7,538,074, which is a division of application No. 10/610,499, filed on Jun. 30, 2003, now Pat. No. 7,267,291, application No. 12/191,089, which is a continuation-in-part of application No. 11/741,199, filed on Apr. 27, 2007.

(56) References Cited

U.S. PATENT DOCUMENTS

| | | | |
|---|---|---|---|
| 3,880,764 A | 4/1975 | Donham | |
| 3,887,474 A | 6/1975 | Senfe et al. | |
| 4,166,582 A * | 9/1979 | Falcon-Steward | 241/16 |
| 4,476,029 A | 10/1984 | Sy et al. | |
| 4,770,795 A | 9/1988 | Giddings et al. | |
| 6,586,372 B1 | 7/2003 | Bradbury et al. | |
| 7,176,165 B2 | 2/2007 | Massam et al. | |
| 2003/0203822 A1 | 10/2003 | Bradbury et al. | |
| 2004/0127366 A1 | 7/2004 | Bradbury et al. | |
| 2005/0101493 A1 | 5/2005 | Bradbury et al. | |
| 2005/0277551 A1 | 12/2005 | Massam et al. | |
| 2005/0277553 A1 | 12/2005 | Massam et al. | |
| 2006/0188651 A1 | 8/2006 | Bradbury et al. | |

OTHER PUBLICATIONS

International Preliminary Report on Patentability issued in PCT Application No. US2007/071338 dated Mar. 26, 2009 (6 pages).
International Preliminary Report on Patentability issued in PCT Application No. US2007/078159 dated Mar. 26, 2009. (9 pages).
International Preliminary Report on Patentability issued in PCT Application No. US2007/071344 dated Mar. 26, 2009. (8 pages).
Extended European Search Report issued in Application No. 07798639.6 dated Aug. 27, 2009 (8 pages).
Extended European Search Report issued in Application No. 07784448.8 dated Aug. 27, 2009 (8 pages).

* cited by examiner

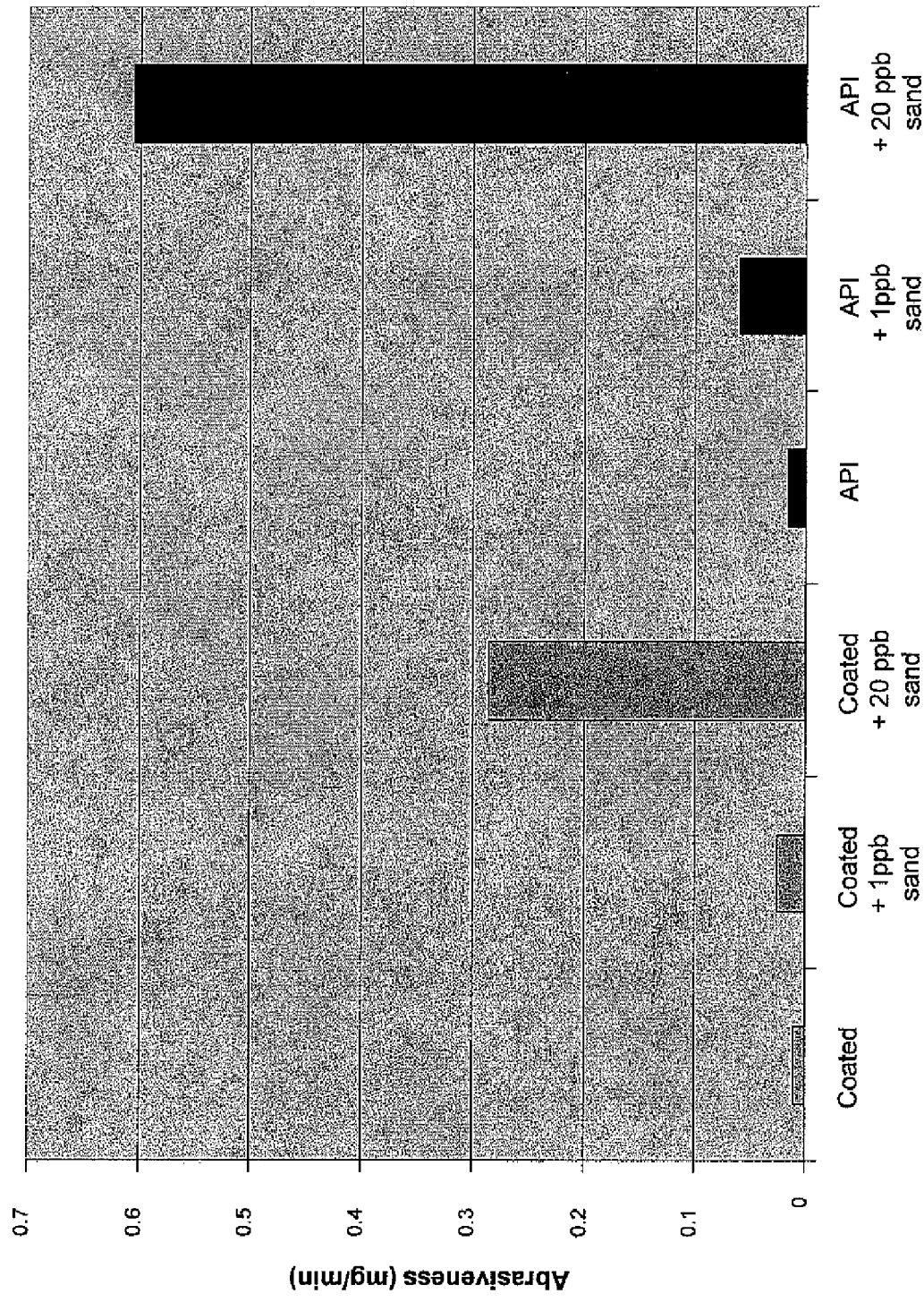
Figure 1: Comparison of the coated micronized barite and API-grade barite

REDUCED ABRASIVENESS WITH MICRONIZED WEIGHTING MATERIAL

CROSS-REFERENCE TO RELATED APPLICATIONS

This application is a continuation-in-part of co-pending U.S. patent application Ser. Nos. 11/737,284 and 11/737,303, which are, respectively, a continuation application and a divisional application of U.S. patent application Ser. No. 10/610,499, which is a continuation-in-part of U.S. application Ser. No. 09/230,302, which is the U.S. national phase application under 35 U.S.C. § 371 of a PCT International Application No. PCT/EP97/003802, filed Jul. 16, 1997 which in turn claims priority under the Paris Convention to United Kingdom Patent Application No. 9615549.4 filed Jul. 24, 1996. This application is also a continuation-in-part application of co-pending U.S. patent application Ser. No. 11/617,576, which is a continuation application of U.S. patent application Ser. No. 11/145,054; now U.S. Pat. No. 7,176,165, which claims priority to U.S. Provisional Application Ser. No. 60/576,420. This application is also a continuation-in-part application of co-pending U.S. patent application Ser. No. 11/617,031, which is a continuation application of U.S. patent application Ser. No. 11/145,053, now U.S. Pat. No. 7,169,738, which claims priority to U.S. Provisional Application Ser. No. 60/576,420. This application is also a continuation-in-part application of U.S. patent application Ser. No. 11/741,199, which claims priority to U.S. Provisional Application Ser. No. 60/825,156. Each of the above listed priority documents is hereby incorporated by reference.

BACKGROUND OF INVENTION

1. Field of the Disclosure

Embodiments disclosed herein relate generally to wellbore fluids used in downhole operations. In particular, embodiments disclosed herein relate to wellbore fluids possessing decreased abrasiveness.

2. Background

In the exploration for natural resources, such as oil and gas, drilling assemblies are used to penetrate earth formations of varying hardnesses. The drilling assembly typically comprises an earth-boring drill bit mounted on the lower end of a drill string, which is rotated by rotating the drill string at the surface or by actuation of downhole motors or turbines, or by both methods. When weight is applied to the drill string, the rotating drill bit engages the earth formation and proceeds to form a borehole along a predetermined path toward a target zone. The mechanism of the engagement of the earth formation is dependent on the type of drill bit used in the assembly, and may be any of shearing, crushing, gouging or abrading mechanisms. These downhole tools are therefore constantly subjected to erosive forces whilst engaging the earthen formation.

Drilling fluids are pumped down the drill string and across the surface of the drill bit where it cools and cleans the drill bit surface. Various fluids are used when drilling or completing a well, and the fluids may be used for a variety of reasons. Common uses for well fluids include: lubrication and cooling of drill bit cutting surfaces while drilling generally or drilling-in (i.e., drilling in a targeted petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, fluid used for emplacing a packer, abandoning the well or preparing the well for abandonment, and otherwise treating the well or the formation.

Proper movement of the wellbore fluids, used to remove the rock cuttings and cool the exposed surface of the cutting tool, is important for the proper function and performance of these cutting tools. For example, the cutting face of a diamond impregnated bit typically includes an arrangement of recessed fluid paths intended to promote uniform flow from a central plenum to the periphery of the bit. The fluid paths usually divide the abrasive layer into distinct raised ribs with diamonds exposed on the tops of the ribs. The fluid provides cooling for the exposed diamonds and forms a slurry with the rock cuttings or drill solids. The slurry must travel across the top of the rib before reentering the fluid paths, which contributes to wear of the supporting material.

In general, drilling fluids should be pumpable under pressure down through strings of drilling pipe, then through and around the drilling bit head deep in the earth, and then returned back to the earth surface through an annulus between the outside of the drill stem and the hole wall or casing. Beyond providing drilling lubrication and efficiency, and retarding wear, drilling fluids should suspend and transport solid particles to the surface for separation and disposal. In addition, the fluids should be capable of suspending additive weighting agents (to increase specific gravity of the mud), generally finely ground barites (barium sulfate), and transport clay and other substances capable of adhering to and coating the borehole surface.

Drilling fluids are generally characterized as thixotropic fluid systems. That is, they exhibit low viscosity when sheared, such as when in circulation (as occurs during pumping or contact with the moving drilling bit). However, when the shearing action is halted, the fluid should be capable of suspending the solids it contains to prevent gravity separation. In addition, when the drilling fluid is under shear conditions and a free-flowing near-liquid, it must retain a sufficiently high enough viscosity to carry all unwanted particulate matter from the bottom of the well bore to the surface. The drilling fluid formulation should also allow the cuttings and other unwanted particulate material to be separated from the liquid fraction after transport to the surface.

There is an increasing need for drilling fluids having the rheological profiles that enable wells, especially deep or horizontal wells, to be drilled more easily. Drilling fluids having tailored rheological properties ensure that cuttings are removed from the wellbore as efficiently and effectively as possible to avoid the formation of cuttings beds in the well which can cause the drill string to become stuck, among other issues. There is also the need from a drilling fluid hydraulics perspective, particularly with respect to equivalent circulating density, to reduce the pressures required to circulate the fluid. This helps to avoid exposing the formation to excessive forces that can fracture the formation causing the fluid, and possibly the well, to be lost. In addition, an enhanced profile is necessary to prevent settlement or sag of the weighting agent in the fluid, if this occurs it can lead to an uneven density profile within the circulating fluid system, which can result in loss of well control, such as due to gas/fluid influx, and wellbore stability problems, such as caving and fractures.

Fluid characteristics required to meet these challenges include, for instance, that the fluid must be easy to pump, requiring the minimum amount of pressure to force the fluid through restrictions in the circulating fluid system, such as bit nozzles or down-hole tools. In other words, the fluid should have the lowest possible viscosity under high shear conditions. Conversely, in zones of the well where the flow area is large, velocity of the fluid is low, where there are low shear conditions, or when the fluid is static, the viscosity of the fluid should be as high as possible in order to prevent settlement, suspend, and transport the weighting material and drilled cuttings. However, it should also be noted that the viscosity of the fluid should not continue to increase under static conditions to unacceptable levels. Otherwise, when fluid circulation is regained, this can lead to excessive pressures that can fracture the formation or alternatively can lead to lost time if the force required to regain a fully circulating fluid system is beyond the limits of the pumps.

Wellbore fluids must also contribute to the stability of the well bore, and control the flow of gas, oil or water from the pores of the formation in order to prevent, for example, the flow or blow out of formation fluids or the collapse of pressured earth formations. The column of fluid in the hole exerts a hydrostatic pressure proportional to the depth of the hole and the density of the fluid. High-pressure formations may require a fluid with a specific gravity of 3.0 or higher. As such, weighting agents for drilling fluids are mainly selected based on the density they provide for maintaining wellbore stability.

Additionally, when a drill bit wears out, or fails as a bore hole is being drilled, it is necessary to withdraw the drill string for replacing the bit. The amount of time required to replace a bit and return the drill string to functional use is essentially lost from drilling operation. This time can become a significant portion of the total time for completing a well, especially if the well depths are great. This excessive wear due to abrasion therefore also results in increased maintenance and production cutbacks. Abrasive wear on downhole equipment can incur large costs.

Reducing the abrasive wear of downhole tools may reduce downtime for repair. This would prolong the time spent drilling and therefore increase the efficiency and cost-effectiveness of the drilling operation. Accordingly, there exists an increasing need to maximize the service life of downhole tools.

SUMMARY OF INVENTION

In one aspect, embodiments disclosed herein relate to a method of prolonging the average lifespan of downhole tools that includes circulating the wellbore fluid comprising a base fluid and at least one of a micronized weighting agent and a dispersant coated weighting agent through the wellbore; wherein the wellbore fluid is characterized as having at least one of an equivalent weight an equivalent or lower settling rate, and an equivalent or lower sag than a baseline wellbore fluid comprising a base fluid and an API-grade barite weighting agent; and wherein the wellbore fluid reduces abrasive wear of the downhole tool as compared to drilling with the baseline wellbore fluid.

In another aspect, embodiments disclosed herein relate to a method of lubricating downhole tools that includes circulating the wellbore fluid comprising a base fluid and at least one of a micronized weighting agent and a dispersant coated weighting agent through the wellbore; wherein the wellbore fluid is characterized as having at least one of an equivalent weight, an equivalent or lower settling rate, and an equivalent or lower sag than a baseline wellbore fluid comprising a base fluid and an API-grade barite weighting agent, wherein the wellbore fluid coats the downhole tool; and wherein the wellbore fluid reduces abrasive wear of the downhole tool as compared to drilling with the baseline wellbore fluid.

Other aspects and advantages of the invention will be apparent from the following description and the appended claims.

BRIEF DESCRIPTION OF DRAWINGS

FIG. 1 shows results of an API abrasion test.

DETAILED DESCRIPTION

In one aspect, embodiments disclosed herein relate to drilling or completing an earth formation using a wellbore fluid. In other aspects, embodiments disclosed herein relate to reducing abrasiveness when drilling or completing an earth formation by using a wellbore fluid comprising a base fluid and a micronized weighting agent. In other aspects, embodiments disclosed herein relate to reducing abrasiveness when drilling or completing an earth formation by using a wellbore fluid comprising a base fluid and a dispersant coated micronized weighting agent. Wellbore fluids disclosed herein comprising micronized and/or dispersant coated micronized weighting agents may provide for reduced abrasiveness as compared to typical wellbore fluids formed with API-grade barite.

Fluids used in embodiments disclosed herein may include micronized weighting agents. In some embodiments, the micronized weighting agents may be uncoated. In other embodiments, the micronized weighting agents may be coated with a dispersant. For example, fluids used in some embodiments disclosed herein may include dispersant coated micronized weighting agents. The coated weighting agents may be formed by either a dry coating process or a wet coating process. Weighting agents suitable for use in other embodiments disclosed herein may include those disclosed in U.S. Patent Application Publication Nos. 20040127366, 20050101493, 20060188651, U.S. Pat. Nos. 6,586,372 and 7,176,165, and U.S. Provisional Application Ser. No. 60/825,156, each of which is hereby incorporated by reference.

Micronized weighting agents used in some embodiments disclosed herein may include a variety of compounds well known to one of skill in the art. In a particular embodiment, the weighting agent may be selected from one or more of the materials including, for example, barium sulphate (barite), calcium carbonate (calcite), dolomite, ilmenite, hematite or other iron ores, olivine, siderite, manganese oxide, and strontium sulphate. One having ordinary skill in the art would recognize that selection of a particular material may depend largely on the density of the material as typically, the lowest wellbore fluid viscosity at any particular density is obtained by using the highest density particles. However, other considerations may influence the choice of product such as cost local availability, the power required for grinding, and whether the residual solids or filter cake may be readily removed from the well.

In one embodiment, the micronized weighting agent may have a $d_{90}$ ranging from 1 to 25 microns and a $d_{50}$ ranging from 0.5 to 10 microns. In another embodiment, the micronized weighting agent includes particles having a $d_{90}$ ranging from 2 to 8 microns and a $d_{50}$ ranging from 0.5 to 5 microns. One of ordinary skill in the art would recognize that, depending on the sizing technique, the weighting agent may have a particle size distribution other than a monomodal distribution. That is, the weighting agent may have a particle size distribution that, in various embodiments, may be monomodal, which may or may not be Gaussian, bimodal, or polymodal.

It has been found that a predominance of particles that are too fine (i.e. below about 1 micron) results in the formation of a high rheology paste. Thus it has been unexpectedly found that the weighting agent particles must be sufficiently small to avoid issues of sag, but not so small as to have an adverse impact on rheology. Thus weighting agent (barite) particles meeting the particle size distribution criteria disclosed herein may be used without adversely impacting the rheological properties of the wellbore fluids. In one embodiment, a micronized weighting agent is sized such that: particles having a diameter less than 1 microns are 0 to 15 percent by volume; particles having a diameter between 1 microns and 4 microns are 15 to 40 percent by volume; particles having a diameter between 4 microns and 8 microns are 15 to 30 by volume; particles having a diameter between 8 microns and 12 microns are 5 to 15 percent by volume; particles having a diameter between 12 microns and 16 microns are 3 to 7 percent by volume; particles having a diameter between 16 microns and 20 microns are 0 to 10 percent by volume; particles having a diameter greater than 20 microns are 0 to 5 percent by volume. In another embodiment, the micronized weighting agent is sized so that the cumulative volume distribution is: less than 10 percent or the particles are less than 1 microns; less than 25 percent are in the range of 1 microns to 3 microns; less than 50 percent are in the range of 2 microns to 6 microns; less than 75 percent are in the range of 6 microns to 10 microns; and less than 90 percent are in the range of 10 microns to 24 microns.

The use of micronized weighting agents has been disclosed in U.S. Patent Application Publication No. 20050277553 assigned to the assignee of the current application, and herein incorporated by reference. Particles having these size distributions may be obtained by several means. For example, sized particles, such as a suitable barite product having similar particle size distributions as disclosed herein, may be commercially purchased. A coarser ground suitable material may be obtained, and the material may be further ground by any known technique to the desired particle size. Such techniques include jet-milling, high performance dry milling techniques, or any other technique that is known in the art generally for milling powdered products. In one embodiment, appropriately sized particles of barite may be selectively removed from a product stream of a conventional barite grinding plant, which may include selectively removing the fines from a conventional API-grade barite grinding operation. Fines are often considered a by-product of the grinding process, and conventionally these materials are blended with courser materials to achieve API-grade barite. However, in accordance with the present disclosure, these by-product fines may be further processed via an air classifier to achieve the particle size distributions disclosed herein. In yet another embodiment, the micronized weighting agents may be formed by chemical precipitation. Such precipitated products may be used alone or in combination with mechanically milled products.

In some embodiments, the micronized weighting agents include solid colloidal particles having a deflocculating agent or dispersant coated onto the surface of the particle. Further, one of ordinary skill would appreciate that the term "colloidal" refers to a suspension of the particles, and does not impart any specific size limitation. Rather, the size of the micronized weighting agents of the present disclosure may vary in range and are only limited by the claims of the present application. The micronized particle size generates high density suspensions or slurries that show a reduced tendency to sediment or sag, while the dispersant on the surface of the particle controls the inter-particle interactions resulting in lower rheological profiles. Thus, the combination of high density, fine particle size, and control of colloidal interactions by surface coating the particles with a dispersant reconciles the objectives of high density, lower viscosity and minimal sag.

In some embodiments, a dispersant may be coated onto the particulate weighting additive during the comminution (grinding) process. That is to say, coarse weighting additive is ground in the presence of a relatively high concentration of dispersant such that the newly formed surfaces of the fine particles are exposed to and thus coated by the dispersant. It is speculated that this allows the dispersant to find an acceptable conformation on the particle surface thus coating the surface. Alternatively, it is speculated that because a relatively higher concentration of dispersant is in the grinding fluid, as opposed to that in a drilling fluid, the dispersant is more likely to be adsorbed (either physically or chemically) to the particle surface. As that term is used in herein, "coating of the surface" is intended to mean that a sufficient number of dispersant molecules are adsorbed (physically or chemically) or otherwise closely associated with the surface of the particles so that the fine particles of material do not cause the rapid rise in viscosity observed in the prior art. By using such a definition, one of skill in the art should understand and appreciate that the dispersant molecules may not actually be fully covering the particle surface and that quantification of the number of molecules is very difficult. Therefore, by necessity, reliance is made on a results oriented definition. As a result of the process, one can control the colloidal interactions of the fine particles by coating the particle with dispersants prior to addition to the wellbore fluid. By doing so, it is possible to systematically control the rheological properties of fluids containing in the additive as well as the tolerance to contaminants in the fluid in addition to enhancing the fluid loss (filtration) properties of the fluid.

In some embodiments, the weighting agents include dispersed solid colloidal particles with a weight average particle diameter ($d_{50}$) of less than 10 microns that are coated with a polymeric deflocculating agent or dispersing agent. In other embodiments, the weighting agents include dispersed solid colloidal particles with a weight average particle diameter ($d_{50}$) of less than 8 microns that are coated with a polymeric deflocculating agent or dispersing agent; less than 6 microns in other embodiments; less than 4 microns in other embodiments; and less than 2 microns in yet other embodiments. The fine particle size will generate suspensions or slurries that will show a reduced tendency to sediment or sag, and the polymeric dispersing agent on the surface of the particle may control the inter-particle interactions and thus will produce lower rheological profiles. It is the combination of fine particle size and control of colloidal interactions that reconciles the two objectives of lower viscosity and minimal sag. Additionally, the presence of the dispersant in the comminution process yields discrete particles which can form a more efficiently packed filter cake and so advantageously reduce filtration rates.

Coating of the micronized weighting agent with the dispersant may also be performed in a dry blending process such that the process is substantially free of solvent. The process includes blending the weighting agent and a dispersant at a desired ratio to form a blended material. In one embodiment, the weighting agent may be un-sized initially and rely on the blending process to grind the particles into the desired size range as disclosed above. Alternatively, the process may begin with sized weighting agents. The blended material may then be fed to a heat exchange system, such as a thermal desorption system. The mixture may be forwarded through the heat exchanger using a mixer, such as a screw conveyor. Upon cooling, the polymer may remain associated with the weighting agent. The polymer/weighting agent mixture may then be separated into polymer coated weighting agent, unassociated polymer, and any agglomerates that may have formed. The unassociated polymer may optionally be recycled to the beginning of the process, if desired. In another embodiment, the dry blending process alone may serve to coat the weighting agent without heating.

Alternatively, a sized weighting agent may be coated by thermal adsorption as described above, in the absence of a dry blending process. In this embodiment, a process for making a coated substrate may include heating a sized weighting agent to a temperature sufficient to react monomeric dispersant onto the weighting agent to form a polymer coated sized weighting agent and recovering the polymer coated weighting agent. In another embodiment, one may use a catalyzed process to form the polymer in the presence of the sized weighting agent. In yet another embodiment, the polymer may be preformed and may be thermally adsorbed onto the sized weighting agent.

In some embodiments, the micronized weighting agent may be formed of particles that are composed of a material of specific gravity of at least 2.3; at least 2.4 in other embodiments; at least 2.5 in other embodiments; at least 2.6 in other embodiments; and at least 2.68 in yet other embodiments. For example, a weighting agent formed of particles having a specific gravity of at least 2.68 may allow wellbore fluids to be formulated to meet most density requirements yet have a particulate volume fraction low enough for the fluid to be pumpable.

As mentioned above, embodiments of the micronized weighting agent may include a deflocculating agent or a dispersant. In one embodiment, the dispersant may be selected from carboxylic acids of molecular weight of at least 150 Daltons, such as oleic acid and polybasic fatty acids, alkylbenzene sulphonic acids, alkane sulphonic acids, linear alpha-olefin sulphonic acids, phospholipids such as lecithin, including salts thereof and including mixtures thereof. Synthetic polymers may also be used, such as HYPERMER OM-1 (Imperial Chemical Industries, PLC, London, United Kingdom) or polyacrylate esters, for example. Such polyacrylate esters may include polymers of stearyl methacrylate and/or butylacrylate. In another embodiment, the corresponding acids methacrylic acid and/or acrylic acid may be used. One skilled in the art would recognize that other acrylate or other unsaturated carboxylic acid monomers (or esters thereof) may be used to achieve substantially the same results as disclosed herein.

When a dispersant coated micronized weighting agent is to be used in water-based fluids, a water soluble polymer of molecular weight of at least 2000 Daltons may be used in a particular embodiment. Examples of such water soluble polymers may include a homopolymer or copolymer of any monomer selected from acrylic acid, itaconic acid, maleic acid or anhydride, hydroxypropyl acrylate vinylsulphonic acid, acrylamido 2-propane sulphonic acid, acrylamide, styrene sulphonic acid, acrylic phosphate esters, methyl vinyl ether and vinyl acetate or salts thereof.

The polymeric dispersant may have an average molecular weight from about 10,000 Daltons to about 300,000 Daltons in one embodiment, from about 17,000 Daltons to about 40,000 Daltons in another embodiment, and from about 200,000-300,000 Daltons in yet another embodiment. One of ordinary skill in the art would recognize that when the dispersant is added to the weighting agent during a grinding process, intermediate molecular weight polymers (10,000-300,000 Daltons) may be used.

Further, it is specifically within the scope of the embodiments disclosed herein that the polymeric dispersant be polymerized prior to or simultaneously with the wet or dry blending processes disclosed herein. Such polymerizations may involve, for example, thermal polymerization, catalyzed polymerization, initiated polymerization or combinations thereof.

Given the particulate nature of the micronized and dispersant coated micronized weighting agents disclosed herein, one of skill in the art should appreciate that additional components may be mixed with the weighting agent to modify various macroscopic properties. For example, anti-caking agents, lubricating agents, and agents used to mitigate moisture build-up may be included. Alternatively, solid materials that enhance lubricity or help control fluid loss may be added to the weighting agents and wellbore fluid disclosed herein. In one illustrative example, finely powdered natural graphite, petroleum coke, graphitized carbon, or mixtures of these are added to enhance lubricity, rate of penetration, and fluid loss as well as other properties of the drilling fluid. Another illustrative embodiment utilizes finely ground polymer materials to impart various characteristics to the drilling fluid. In instances where such materials are added, it is important to note that the volume of added material should not have a substantial adverse impact on the properties and performance of the drilling fluids. In one illustrative embodiment, polymeric fluid loss materials comprising less than 5 percent by weight are added to enhance the properties of the drilling fluid. Alternatively, less than 5 percent by weight of suitably sized graphite and petroleum coke are added to enhance the lubricity and fluid loss properties of the fluid. Finally, in another illustrative embodiment, less than 5 percent by weight of a conventional anti-caking agent is added to assist in the bulk storage of the weighting materials.

Other additives that may be included in the wellbore fluids disclosed herein include for example, wetting agents, organophilic clays, viscosifiers, fluid loss control agents, surfactants, dispersants, interfacial tension reducers, pH buffers, mutual solvents, thinners, thinning agents and cleaning agents. The addition of such agents should be well known to one of ordinary skill in the art of formulating drilling fluids and muds.

The particulate materials as described herein (i.e., the coated and/or uncoated micronized weighting agents) may be added to a drilling fluid as a weighting agent in a dry form or concentrated as slurry in either an aqueous medium or as an organic liquid. As is known, an organic liquid should have the necessary environmental characteristics required for additives to oil-based drilling fluids. With this in mind, the oleaginous fluid may have a kinematic viscosity of less than 10 centistokes (10 $mm^2/s$) at 40° C. and, for safety reasons, a flash point of greater than 60° C. Suitable oleaginous liquids are, for example, diesel oil, mineral or white oils, n-alkanes or synthetic oils such as alpha-olefin oils, ester oils, mixtures of these fluids, as well as other similar fluids known to one of skill in the art of drilling or other wellbore fluid formulation. In one embodiment, the desired particle size distribution is achieved via wet milling of the courser materials in the desired carrier fluid.

The sized particles described above (i.e., the coated and/or uncoated micronized weighting agents) may be used in any wellbore fluid such as drilling, cementing, completion, packing, work-over (repairing), stimulation, well killing, spacer fluids, and other uses of high density fluids, such as in a dense media separating fluid or in a ship's or other vehicle's ballast fluid. Such alternative uses, as well as other uses, of the present fluid should be apparent to one of skill in the art given the present disclosure. In accordance with one embodiment, the weighting agents may be used in a wellbore fluid formulation. The wellbore fluid may be a water-based fluid, a direct emulsion, an invert emulsion, or an oil-based fluid.

Water-based wellbore fluids may have an aqueous fluid as the base liquid and at least one of a micronized and a dispersant coated micronized weighting agent. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium, and salts of chlorides, bromides, carbonates, iodides, chlorates, bromates, formates, sulfates, silicates, phosphates, nitrates, oxides, and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

The oil-based/invert emulsion wellbore fluids may include an oleaginous continuous phase, a non-oleaginous discontinuous phase, and at least one of a micronized and a dispersant coated micronized weighting agent. One of ordinary skill in the art would appreciate that the dispersant coated weighting agents described above may be modified in accordance with the desired application. For example, modifications may include the hydrophilic/hydrophobic nature of the dispersant.

The oleaginous fluid may be a liquid, such as a natural or synthetic oil, and in some embodiments is selected from the group including diesel oil; mineral oil; a synthetic oil, such as hydrogenated and unhydrogenated olefins including polyolefins, linear and branch olefins and the like, polydiorganosiloxanes, siloxanes, or organosiloxanes, esters of fatty acids, specifically straight chain, branched and cyclical alkyl ethers of fatty acids, mixtures thereof and similar compounds known to one of skill in the art; and mixtures thereof. The concentration of the oleaginous fluid should be sufficient so that an invert emulsion forms, and may be less than about 99 percent by volume of the invert emulsion. In one embodiment, the amount of oleaginous fluid is from about 30 percent to about 95 percent by volume and more preferably about 40 percent to about 90 percent by volume of the invert emulsion fluid. The oleaginous fluid, in one embodiment, may include at least 5 percent by volume of a material selected from the group including esters, ethers, acetals, dialkylcarbonates, hydrocarbons, and combinations thereof.

The non-oleaginous fluid used in the formulation of the invert emulsion fluid disclosed herein is a liquid and may be an aqueous liquid. In one embodiment, the non-oleaginous liquid may be selected from the group including sea water, a brine containing organic and/or inorganic dissolved salts, liquids containing water-miscible organic compounds and combinations thereof. The amount of the non-oleaginous fluid is typically less than the theoretical limit needed for forming an invert emulsion. Thus, in one embodiment the amount of non-oleaginous fluid is less that about 70 percent by volume and preferably from about 1 percent to about 70 percent by volume. In another embodiment, the non-oleaginous fluid is preferably from about 5 percent to about 60 percent by volume of the invert emulsion fluid. The fluid phase may include either an aqueous fluid or an oleaginous fluid, or mixtures thereof. In a particular embodiment, coated barite or other weighting agents may be included in a wellbore fluid comprising an aqueous fluid that includes at least one of fresh water, sea water, brine, and combinations thereof.

The wellbore fluids disclosed herein are especially useful in the drilling, completion and working over of subterranean oil and gas wells. In particular the fluids disclosed herein may find use in formulating drilling muds and completion fluids that allow for the easy and quick removal of the filter cake. Such muds and fluids are especially useful in the drilling of horizontal wells into hydrocarbon bearing formations.

Conventional methods may be used to prepare the drilling fluids disclosed herein in a manner analogous to those normally used, to prepare conventional water- and oil-based drilling fluids. In one embodiment, a desired quantity of water-based fluid and a suitable amount of at least one of the micronized and the dispersant coated micronized weighting agents are mixed together and the remaining components of the drilling fluid added sequentially with continuous mixing. In another embodiment, a desired quantity of oleaginous fluid, such as a base oil, a non-oleaginous fluid, and a suitable amount of the micronized and/or dispersant coated micronized weighting agent are mixed together and the remaining components are added sequentially with continuous mixing. An invert emulsion may be formed by vigorously agitating, mixing or shearing the oleaginous fluid and the non-oleaginous fluid.

The properties of the wellbore fluids disclosed herein may allow for the wellbore fluid to meet the requirements of low sag during drilling, including horizontal drilling, and low settling of drilled solids and weighting agents when the wellbore fluid is static. It has also been found, in some embodiments, that wellbore fluids described herein may also provide for decreased abrasiveness when drilling.

Abrasiveness may be defined as the property of a material to remove matter from another surface by friction. Weighted wellbore fluids are abrasive in nature due to the weighting agents suspended therein. As these wellbore fluids are pumped through the drilling assembly, the weighting agents scour and abrade all surfaces with which they come in contact. The drill solids suspended in the fluids also abrade all surfaces with which they come in contact. These surfaces include, for example, the drill pipes, downhole tools, and pumps. This continuous abrasion by the circulating fluid causes erosive wear of the drill assembly. As described above, this wear may result in failure of the drill bit, or other parts of the drill assembly. Drilling activity may be halted to replace the worn parts. This downtime may prove expensive, both in terms of lost time and lost productivity.

Abrasiveness of wellbore fluids may be quantified by the use of an abrasion test. For example, Einlehner method and the API method may be used to determine the abrasion of a fluid. Typically, the abrasion test measures weight loss of a specially shaped, stainless-steel mixer blade after 20 minutes at 11,000 rpm running in the test sample. Abrasiveness is quantified by the rate of weight loss and is reported in units of mg/min. Mineral hardness, particle size and shape are the main parameters that affect abrasiveness of weighting materials.

In one embodiment, the wellbore fluids of this disclosure may have an abrasiveness of less than 0.3 as measured by the Einlehner Test. In another embodiment, the wellbore fluids of this disclosure may have an abrasiveness of less than 0.2 as measured by the Einlehner Test. In yet another embodiment, the wellbore fluids of this disclosure may have an abrasiveness of less than 0.1.

The micronized size of the weighting agents of this disclosure may result in reduced coefficient of friction (μ). The coefficient of friction, also known as the frictional coefficient, is a dimensionless scalar value which describes the ratio of the force of friction between two bodies and the force pressing them together. The coefficient of friction depends on the properties of the materials used, for example, smoothness and adhesiveness, and may range in value from near zero to greater than one. The wellbore fluids of this disclosure comprise micron-sized weighting agents, which may tend to reduce the coefficient of friction. As a result, the abrasiveness of the wellbore fluid may be less than for conventional wellbore fluids containing larger, more irregular particles.

In one embodiment, the wellbore fluids of this disclosure may have a coefficient of friction which is at least 30% less than a baseline drilling fluid. In another embodiment, the wellbore fluids of this disclosure may have a coefficient of friction which is at least 20% less than a baseline drilling fluid. In yet another embodiment, the wellbore fluids of this disclosure may have a coefficient of friction which is at least 10% less than a baseline drilling fluid.

Wellbore fluids having lower rheological profiles as described herein may therefore allow an operator to achieve longer downhole tool service life, and therefore increase well operation efficiency. Applicants have surprisingly found that embodiments of the fluids described herein are less abrasive than conventional wellbore fluids. The use of the wellbore fluids such as described in this invention may therefore prolong the service life of the various parts of the drill assembly.

EXAMPLES

The following examples are to illustrate the properties and performance of the wellbore fluids of the present disclosure, although the invention is not limited to the specific embodiments shown in these examples.

Example I

The following examples include exemplary wellbore fluids, and experimental data showing their rheological properties and their abrasiveness. Two fluids were formulated as shown below in Table 1, one containing a dispersant coated micronized weighting agent, such as fluids described herein (coated), and one containing API-grade barite (API).

Quantities of each component are expressed in pounds per barrel (ppb) as shown in Table 1 below (EMUL HT™ and TRUVUS™ are each available from M-I LLC, Houston, Tex.).

TABLE 1

| Product | Coated | | API | |
|---|---|---|---|---|
| | 11 ppg | 16 ppg | 11 ppg | 16 ppg |
| EDC Base Oil | As required | As required | As required | As required |
| Weighting Agent | As required | As required | As required | As required |

TABLE 1-continued

| Product | Coated | | API | |
|---|---|---|---|---|
| | 11 ppg | 16 ppg | 11 ppg | 16 ppg |
| EMUL HT ™ | 10 ppb | 12 ppb | 10 ppb | 12 ppb |
| Lime | 5 ppb | 5 ppb | 5 ppb | 5 ppd |
| TRUVIS ™ | 3 ppb | 2 ppb | 5 ppb | 4 ppb |
| $CaCl_2$ brine (25% w/w) | As required | As required | As required | As required |

Rheological properties were determined using a Fann Model 35 viscometer, available from Fann Instrument Company. The results are shown in Table 2 below.

TABLE 2

| Fluid Properties | | |
|---|---|---|
| Rheology at 120° F. | Coated | API |
| Plastic viscosity (cPs) | 14 | 22 |
| Yield Point (lb/100 ft$^2$) | 6 | 22 |
| Viscosity (Fann units) 6/3 rpm | 4/3 | 14/12 |

The results show an enhanced profile with fluids containing the dispersant coated weighting agent giving a lower plastic viscosity, yield point, and low-shear rate viscosities than those containing API-grade barite.

Abrasion tests were conducted on these fluids using the API method (measuring weight loss of a mixer head immersed in the test fluids). The results are shown in FIG. 1.

The results at both 11 ppg and 16 ppg weightings show enhanced rheological profiles with the fluids comprising the dispersant coated weighting agent giving lower low-shear viscosities, gel strength, and yield point than with other weighting agents. The results show that at a fluid comprising the coated weighting agent showed less weight loss after 1 hour than fluids with API-grade barite.

Advantageously, embodiments of the present disclosure may provide for lower abrasiveness when drilling. As compared to typical drilling fluids containing API-grade barite weighting agents, embodiments of the drilling fluid disclosed herein, the drilling fluid comprising a base fluid and at least one of a micronized and a dispersant coated weighting agent, may allow for lower rates of abrasiveness when drilling to be achieved, while at the same time having one or more of: an equivalent or lower sag, an equivalent or lower settling rate, an equivalent density (weight), a similar base fluid composition (oil-water ratio), an equivalent or lower pressure drop, and increased turbulence in the bit area and near bit region of the annulus.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed is:

1. A method of prolonging the average lifespan of downhole tools, the method comprising:
   circulating the wellbore fluid comprising a base fluid and at least one of a micronized weighting agent having a particle size $d_{90}$ of less than about 10 microns and a dispersant coated weighting agent having a particle size $d_{90}$ of less than about 10 microns through the wellbore;

wherein the wellbore fluid is characterized as having at least one of an equivalent weight, an equivalent or lower settling rate, and an equivalent or lower sag than a baseline wellbore fluid comprising a base fluid and an API-grade barite weighting agent; and wherein the wellbore fluid reduces abrasive wear of the downhole tool as compared to drilling with the baseline wellbore fluid.

2. The method of claim 1, wherein the wellbore fluid possesses an abrasiveness of less than 0.3 compared with the baseline wellbore fluid.

3. The method of claim 1, wherein the wellbore fluid possesses an abrasiveness of less than 0.2 compared with the baseline wellbore fluid.

4. The method of claim 1, wherein the wellbore fluid possesses an abrasiveness of less than 0.1 compared with the baseline wellbore fluid.

5. The method of claim 1, wherein the coefficient of friction of the wellbore fluid is at least 30% less than that of the baseline wellbore fluid.

6. The method of claim 1, wherein the coefficient of friction of the wellbore fluid is at least 20% less than that of the baseline wellbore fluid.

7. The method of claim 1, wherein the coefficient of friction of the wellbore fluid is at least 10% less than that of the baseline wellbore fluid.

8. The method of claim 1, wherein the wellbore fluid comprises a weighting agent is at least one selected from barite, calcium carbonate, dolomite, ilmenite, hematite, olivine, siderite, and strontium sulfate.

9. The method of claim 1, wherein the weighting agent is coated with a dispersant made by a method comprising dry blending a micronized weighting agent and a dispersant to form a micronized weighting agent coated with the dispersant.

10. The method of claim 1, wherein the weighting agents comprise colloidal particles having a coating thereon.

11. The method of claim 10, wherein the coating comprises at least one selected from oleic acid, polybasic fatty acids, alkylbenzene sulfonic acids, alkane sulfonic acids, linear alpha-olefin sulfonic acids, alkaline earth metal salts thereof, polyacrylate esters, and phospholipids.

12. The method of claim 1, wherein the micronized weighting agent has a particle size $d_{90}$ of less than about 5 microns.

13. The method of claim 1, wherein the base fluid is at least one of an oleaginous fluid and a non-oleaginous fluid.

14. A method of lubricating downhole tools, the method comprising:

circulating the wellbore fluid comprising a base fluid and at least one of a micronized weighting agent having a particle size $d_{90}$ of less than about 10 microns and a dispersant coated weighting agent having a particle size $d_{90}$ of less than about 10 microns through the wellbore;

wherein the wellbore fluid is characterized as having at least one of an equivalent weight, an equivalent or lower settling rate, and an equivalent or lower sag than a baseline wellbore fluid comprising a base fluid and an API-grade barite weighting agent, wherein the wellbore fluid coats the downhole tool; and wherein the Wellbore fluid reduces abrasive wear of the downhole tool as compared to drilling with the baseline wellbore fluid.

* * * * *